Sept. 16, 1952     J. M. HAY ET AL     2,610,458
APPARATUS FOR HARVESTING UNDERWATER SEAWEED
Filed Dec. 14, 1949
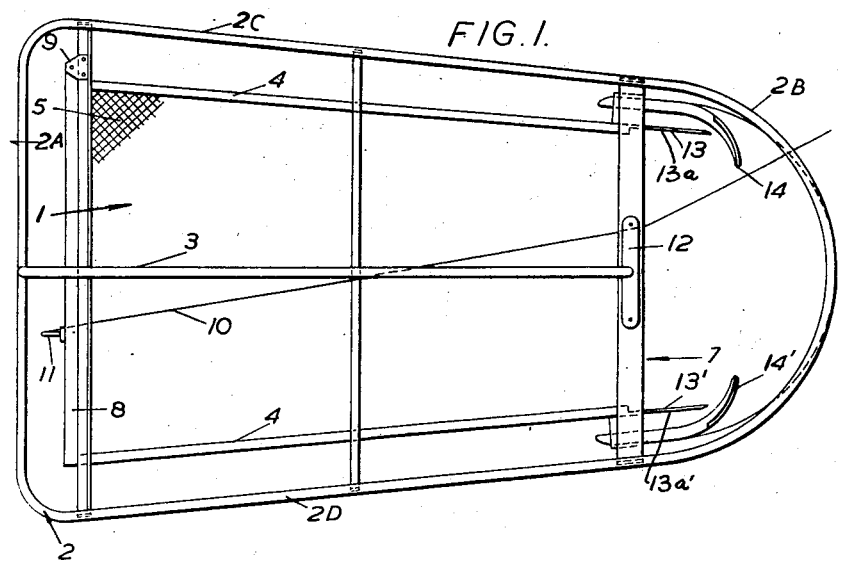
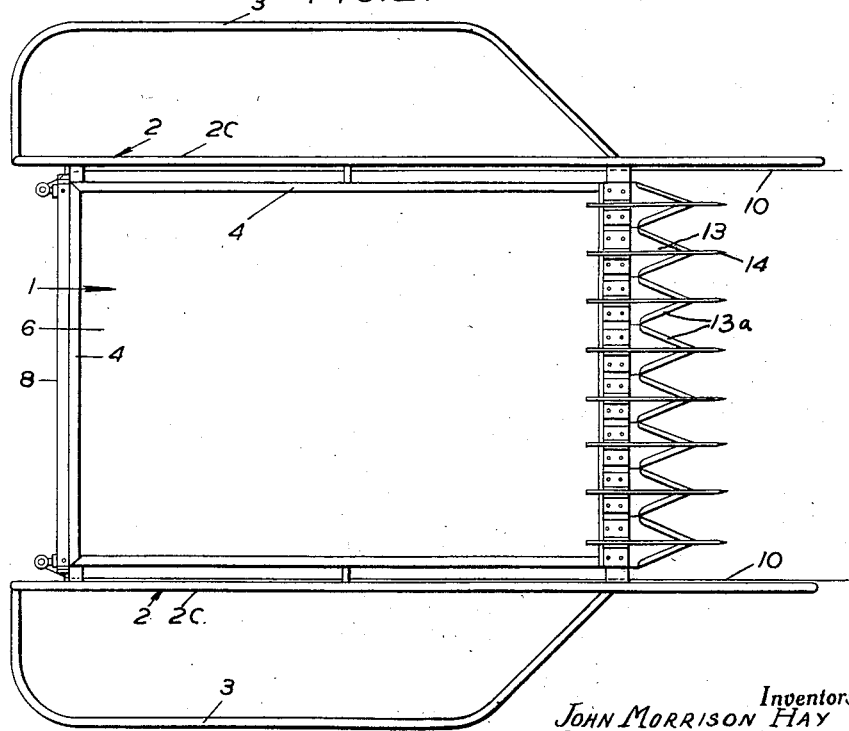
Inventors:
JOHN MORRISON HAY
ROBERT FAULDS McIVER
By Richardson, David and Nordon
Attorneys Patented Sept. 16, 1952

2,610,458

UNITED STATES PATENT OFFICE 2,610,458

APPARATUS FOR HARVESTING UNDER-WATER SEAWEED

John Morrison Hay and Robert Faulds McIver, Edinburgh, Scotland, assignors to Scottish Seaweed Research Association, Edinburgh, Scotland Application December 14, 1949, Serial No. 132,981
In Great Britain December 25, 1948

9 Claims. (Cl. 56—8)

This invention relates to apparatus for harvesting under-water seaweed, and is especially applicable to the harvesting of seaweed belonging to the various species of Laminaria found around the coasts of Scotland.

According to the present invention, we provide apparatus for harvesting under-water seaweed comprising a receptacle to be dragged over the seabed, an inlet mouth at the front of said receptacle, weed cutting means located adjacent said mouth so that cut weed passes into the receptacle, said receptacle being at least partly reticular so as to allow the escape of water but retain the weed.

The term "reticular" is intended to include not only a net or mesh-like formation, but a formation having a plurality of apertures which allow escape of water but retain the cut seaweed.

Preferably the receptacle is provided with a door or the like which can be opened to allow easy removal of the cut seaweed at a part other than the mouth of the receptacle.

An embodiment of the invention will now be described, by way of example, with reference to the accompanying drawing, in which:

Fig. 1 is a side view of the apparatus, and
Fig. 2 is a plan view corresponding to Fig. 1.

Referring to the drawing, the receptacle 1 is mounted between and within two vertical tubular skids 2, one at each side, which in side view are of generally rectangular framelike shape having a vertical rear upright 2A, a front 2B curved forwardly in a vertical plane, and upper and lower parts 2C and 2D which converge slightly towards each other in joining the rear upright to the front part. In addition, each skid is provided at its outer side with a substantially horizontal wing 3 formed by a member which extends outwardly from the rear upright and then bends in again to a front part of the apparatus.

The receptacle 1 is formed by a substantially rectangular framework 4 narrowing slightly towards the forward end and having wire mesh sides 5 with sheet metal top and bottom 6, and with an open mouth 7 at the front. At the rear a door 8 is provided which is hinged about a horizontal axis 9 at the top of the frame. The door 8 is normally retained closed by two cables 10, each attached to the door on one side thereof at an eye 11 and extending forwardly through an eye 12 at the front and the corresponding side of the frame, the cables 10 being led upwardly to the surface for dragging or towing of the trawl along the sea bed. The door 8 is preferably also of wire mesh construction. The receptacle 1 is spaced centrally of the skids 2, as shown in the drawing.

Along the upper and lower edges of the mouth 7 a series of knives 13 and 13' are provided in the form of V-shaped cutting edges 13a and 13a' arranged side by side with the apices pointing forwards and in a substantially horizontal plane. Each apex is protected by a narrow vertical intermediate skid shield 14, 14' mounted on the frame and which in the case of the lower knives 13 extends from below and upwardly in front of the apex, and for the upper knives 13' extends from above and downwards in front of the apex. In a modification these upper and lower shields or intermediate skids may be joined so as to extend continuously in convex curved formation from top to bottom.

As the drawings show, both the mouth 7 and the knives 13 are located well within the limits of the side skids 2, so that they cannot come into contact with the hard rocky seabed no matter what position the receptacle may adopt.

In operation the apparatus is dragged along the seabed the tension in the towing cables 10 keeping the door 8 closed. The skids protect the knives 13 and 13' and enable the apparatus to ride over obstructions, and the knives 13 and 13' cut the weed, allowing it to enter the receptacle 1, while the wire mesh door 8 allows escape of the water. The side wings 3 prevent the trawl tilting over on to either side.

The eyes 12 on the frame sides are elongated vertically so as to allow for upward and downward movement of the cables 10 as the apparatus tilts in the fore and aft direction during travel.

When the receptacle 1 is substantially filled with weed it is hoisted to the surface by means of the cables 10 and is then supported in position and the cables are released to open the door 8 whereupon the seaweed is removed or allowed to drop out.

We claim:
1. Apparatus for harvesting under-water seaweed comprising a frame to be dragged over a seabed, seabed-engaging side skids of framelike construction mounted on said frame, and at least partly reticular receptacle incorporated in said frame, being located between and within said skids and having an inlet mouth in front, and weed cutting means mounted on said frame and located within the limits of said skids and adjacent the mouth, so as to cut weed passing into the receptacle, whereby the mouth and said cutting means are maintained, by said skids, clear of the seabed, said skids consisting of an opposed pair of substantially rectangular tubular frames located in vertical planes and having their front portions forwardly curved in front of said inlet mouth.

2. Apparatus according to claim 1, in which a rear wall of said receptacle comprises a reticular door hinged along its upper edge, and including attachment means mounted on a lower part of the door for tow ropes, whereby during dragging said door is maintained shut.

3. Apparatus according to claim 2 including also eyes affixed to the sides of said frame at the front thereof, said eyes comprising means for receiving the tow ropes and being vertically elongated, whereby to allow for fore-and-aft tilting of the apparatus during dragging.

4. Apparatus for harvesting under-water seaweed comprising a frame to be dragged over a seabed, seabed-engaging side skids of framelike construction on said frame including top upper and lower members, a seaweed receptacle incorporated in said frame, being located between and within said skids and having an inlet mouth in front, and weed cutting means on said frame located within the limits of said skids and adjacent the mouth, said cutting means consisting of upper and lower series of knives having V-shaped cutting edges and being spaced above the seabed.

5. Apparatus according to claim 4 including also a rear wall of the receptacle comprising a door which is reticular, and which is hinged along its upper edge, and attachment means on a lower part of the door for tow ropes so that during dragging the door is maintained shut.

6. Apparatus according to claim 5 including also eyes located on the sides of said frame at the front, said eyes receiving the tow ropes and being vertically elongated to allow for fore-and-aft tilting of the apparatus during dragging.

7. Apparatus according to claim 4 including also a series of auxiliary skid shields located in front of said mouth and extending in front of the knives at the apices of the V's to protect the knives.

8. Apparatus according to claim 1, also including wings comprising members extending outwardly beyond the sides of said frame, said receptacle and said cutting means being located between and within said wings.

9. Apparatus according to claim 8 in which said skids consist of an opposed pair of substantially rectangular tubular frames located in vertical planes and having their front portions forwardly curved in front of said inlet mouth, and said wings consist of an opposed pair of substantially horizontal frames.

JOHN MORRISON HAY.
ROBERT FAULDS McIVER.

REFERENCES CITED

The following references are of record in the file of this patent:

UNITED STATES PATENTS

| Number | Name | Date |
| --- | --- | --- |
| 121,227 | Baker | Nov. 28, 1871 |
| 1,120,206 | Knapp | Dec. 8, 1914 |
| 1,154,357 | West | Sept. 21, 1915 |
| 2,050,133 | Smith | Aug. 4, 1936 |